United States Patent [19]

Bailey et al.

[11] 4,093,678

[45] June 6, 1978

[54] CRYSTALLINE CO-AND TERPOLYMERS OF ETHYLENE AND ACENAPHTHYLENE

[75] Inventors: Frederick Eugene Bailey; Werner Claus von Dohlen, both of Charleston, W. Va.

[73] Assignee: Union Carbide Corporation, New York, N.Y.

[21] Appl. No.: 680,385

[22] Filed: Apr. 26, 1976

[51] Int. Cl.$^2$ ............................................. C08L 23/08
[52] U.S. Cl. ............................... 260/897 A; 526/169; 526/280
[58] Field of Search ........................... 526/280, 169; 260/897 A

[56] References Cited

U.S. PATENT DOCUMENTS

| 2,850,488 | 9/1958 | Baxter | 526/280 |
| 3,119,798 | 1/1964 | Moberly | 526/169 |

OTHER PUBLICATIONS

Chemical Abstracts, vol. 81, No. 25980e, Zagorskaya, 1974.
Chem. Abs., vol. 78, No. 30449f, Yamakita, 1973.
Chem. Abs., vol. 77, No. 140901j, Hayakawa, 1972.
Chem. Abs., vol. 76, No. 141634r, Protasov, 1972.
Chem. Abs., vol. 76, No. 25741z, Zagorskaya, 1972.
Chem. Abs., vol. 71, No. 71727u, Scott, 1969.
Chem. Abs., vol. 62, No. 14888c, Akiyama, 1965.

*Primary Examiner*—Paul R. Michl
*Attorney, Agent, or Firm*—Peter R. Shearer

[57] ABSTRACT

A highly crystalline non-uniform copolymer comprised of ethylene and acenaphthylene, which lacks the independent beta thermomechanical transition in the torsion pendulum loss-modulus curve possessed by known copolymers of ethylene. The non-uniform copolymer being photodegradable. A compatible blend of the polymeric material and high density polyethylene or the polymeric material and low density polyethylene has a higher use temperature than the particular polyethylene by itself.

A though semi-crystalline, high-modulus, semi-elastic, non-uniform terpolymer comprised of ethylene, acenaphthylene and a different alpha-olefin, such non-uniform terpolymer being more elastic than polyethylene.

4 Claims, 2 Drawing Figures

- ◐ High Density Polyethylene
- ● 14.5 mol % acenaphthylene
- ⊖ ~20 mol % 5-methylnorbornene
- ○ 9.5 mol % 1-hexene

CRYSTALLINE CO-AND TERPOLYMERS OF ETHYLENE AND ACENAPHTHYLENE

BACKGROUND OF THIS INVENTION

1. Field of this Invention

This invention relates to polymer compositions and to blends thereof with polyethylene.

2. Prior Art

While elastic behavior in some crystalline polyolefins is known (see *Quyna*, R. G., Preprints of the Tidewater A.I. Ch. E. Meeting — Williamsburg, Va., May, 1970, Celanese), polyethylene in an elastic state is not known.

Plastic packaging films, such as unmodified polyethylene, polypropylene, and polystyrene, are difficultly degradable (see *Plastic Focus*, vol. 4, no. 22, 7/31/72).

Attention is drawn to U.S. Pat. No. 3,299,171, Hungarian Patent No. 154,798, and M. Akiyama, S. Kawakubo and M. Kondo, Rev. Elec. Commun. Lab., (Tokyo), 12 693 (1964), Graft Copolymerization Acenaphthylene On Polyethylene.

Crystalline polymers like polyethylene may be represented as two phase systems where perfect crystals are interconnected by rubbery amorphous phases. Early modles involved "fringed micelle" structures in which most amorphous chains passed from one crystal to another. Observation of polymer single crystals demonstrated the existence of lamellae composed of regular folded chains and that such structures persist in the solid polymer where crystals are imperfect and contain defects such as chain ends, kinks and folds. The amorphous phase is far from rubberlike and involves chain ends, regular and irregular folds and tie chains (between crystallites) of various lengths. For highly crystalline polymers, the crystallites participate in superstructures and consequently stress distribution and mechanical properties depend upon the arrangement of crystals, their size and number, i.e., the polymer morphology.

It was thought that the principal effect of comonomer in polyethylene systems, beyond polar effects on adhesion, compatibility, etc., was reduction of crystallinity with concomitant reduction in stiffness modules and melting point. Principal emphasis was on effectiveness of disrupting crystallinity, dependence on geometric factors such as side chain van der Waals radius and the number of chain atoms on each side of a branch point prevented from crystallizing by the bulk and geometry of the side chain. More recently, evidence has emerged concerning the incorporation of comonomer units within crystalline regions along with crystalline defects which may be produced by a comonomer side chain, chain ends imperfections in the folded chain crystal structure of polyethylene. Comonomer effects then are case in a more complex role.

BROAD DESCRIPTION OF THIS INVENTION

An object of this invention is to provide ethylene-acenaphthylene copolymers and ethylene-alpha-olefin-acenaphthylene terpolymers. Other objects and advantages of this invention are set out herein or are obvious to one ordinarily skilled in the art herefrom.

The polymer composition of this invention achieves the objects and advantages of this invention.

The first embodiment of this invention involves a polymeric material comprised of a highly crystalline non-uniform copolymer comprises of ethylene and acenaphthylene. The non-uniform polymer lacks the independent beta thermomechanical transition in the torsion pendulum loss-modulus curve possessed by known copolymers of ethylene. The non-uniform copolymer and blends thereof are photodegradable. The polymeric material forms a compatible blend with high density polyethylene, such blend having a higher use temperature than such high density polyethylene by itself.

The copolymer of this invention can contain 80 to 97 mole percent of ethylene and 3 to 20 mole percent of acenaphthylene.

The copolymers of the two monomers ethylene and acenaphthylene, contrary to expectations, are highly crystalline, but less crystalline than high density polyethylene (HDPE). At temperatures below about 0° C., copolymers show stiffness comparable with high density polyethylene. But at temperatures above 0° C., the copolymers show stiffness higher than high density polyethylene and maintain a useful degree of stiffness to higher temperatures than do high density polyethylene (HDPE). Such copolymers are useful at 10° to 15° C. higher than high density polyethylene. The copolymers of this invention are more transparent than high density polyethylene and are compatible with high density polyethylene and with low density polyethylene (LDPE). Blends of the copolymers of this invention and high density polyethylene or low density polyethylene can be made having any selected degree of stiffness between that of the copolymer and that of either high density polyethylene or low density polyethylene, along with a concomitant increase in use temperature above that of high density polyethylene or low density polyethylene.

The copolymers of this invention have a lower tendency to creep since it shows no evidence of an independent beta mechanical transition in the torsion pendulum loss-modulus curve. This property, in combination with those given above, means the copolymer has excellent usage in wire and cable applications, especially underground cables, and in a variety of packaging uses. To summarize, the copolymer compositions of this invention of ethylene and acenaphthylene are distinctive in mechanical properties in that they are crystalline, maintain a higher modulus to higher temperatures than commercial high density polyethylene and do not show an independent beta thermomechanical transition in the temperature range of −40° to 20° C., which generally characterizes the known copolymers of ethylene.

Acenaphthylene, surprisingly, has unique properties as a comonomer in that crystalline ethylene copolymer was obtained with the high comonomer content and such copolymer has an acicular, bladed morphology.

The copolymers of ethylene and acenaphthylene have many properties which are generally intermediate between those of high density and low density polyethylene.

The copolymers of this invention are also useful as controlled barrier materials and in film usages.

The second embodiment of this invention involves a polymeric material comprised of a tough, semi-crystalline, high-modulus, semi-elastic, non-uniform terpolymer. The terpolymer contains ethylene, acenaphthylene and a different alpha-olefin. The non-uniform terpolymer is more elastic than polyethylene or the ethylene-acenaphthylene copolymers of this invention.

DETAILED DESCRIPTION OF THIS INVENTION

In the drawings

Figure 1:
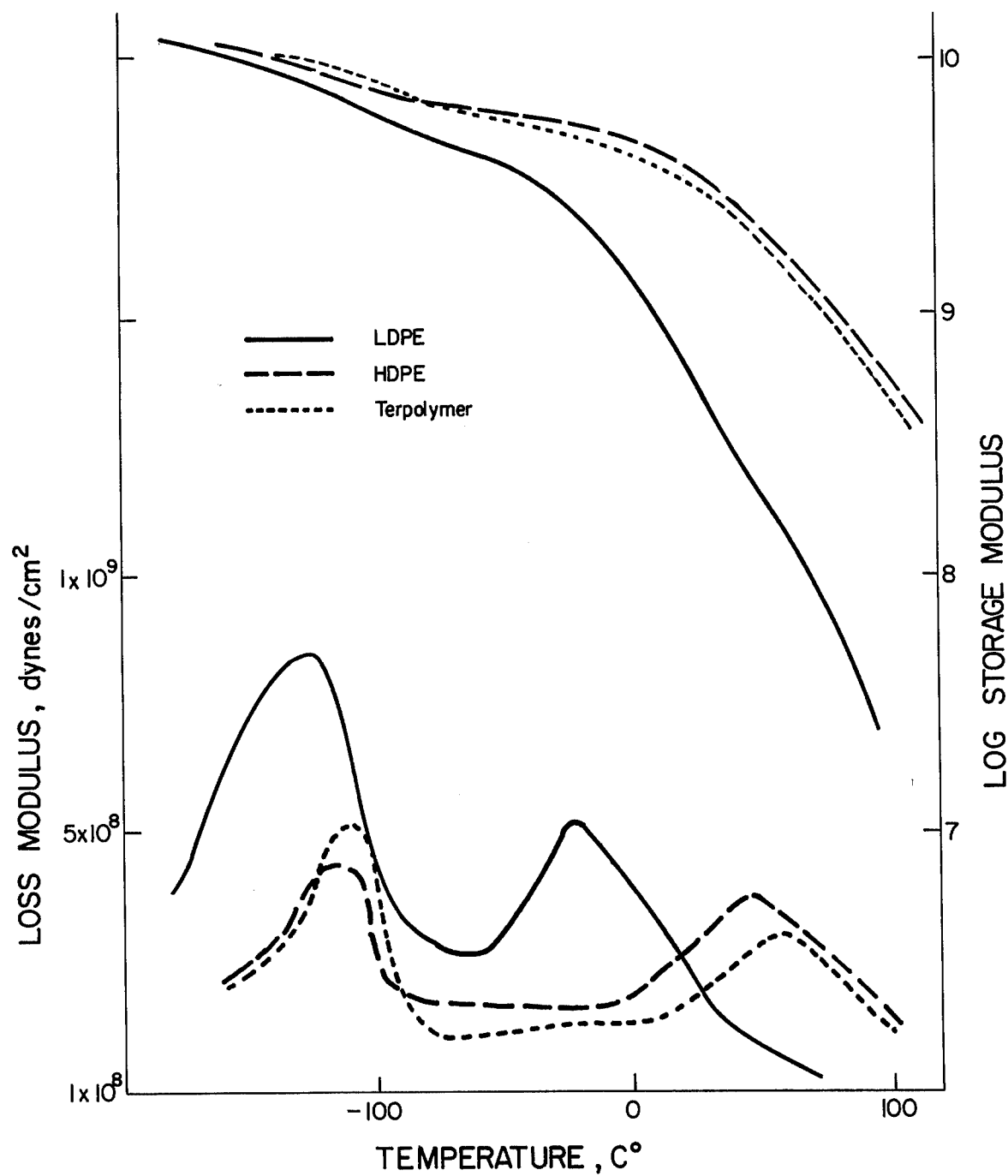
FIG. 1 is a graph of the mechanical properties of the terpolymer.

Heretofore in high density polyethylene systems, the introduction of comonomer leads to a reduction in percent crystallinity and concomitantly stiffness modulus and crystalline melting point. The polyethylenes exhibit three mechanical transitions: a high temperature, $\alpha$-transition in the range of 30° to 60° C. attributed to crystalline reorientation, a low temperature, $\gamma$-transition in the range of $-110°$ to $-120°$ C. attributed to motions of sequences of three or more main-chain methylene units related to intercrystalline motions, and an intermediate $\beta$-transition, associated with branch sites along the main chain and found in the temperature range of $-40°$ to $+15°$ C. depending on branch geometry, bulk and structure.

The ethylene-acenaphthylene copolymer system of this invention, when using compositions in the mid-range of comonomer content by weight, are highly crystalline and have an unusual bladed, acicular morphology. The copolymers have a high weight concentration of aromatic substitution and hence absorb strongly in the U.V. spectra range. Hence the copolymers are useful as photodegradable or environmentally degradable plastic materials. Above 0° C., depending on composition, their modulus is higher and measurable stiffness modulus extends to higher temperatures than high density polyethylene homopolymer made by a similar process. Technically, the copolymers are distinguished from other ethylene copolymers in that the copolymers show no evidence of an independent "$\beta$" mechanical transition. Possibly the "$\beta$", and "$\alpha$" transitions form one composite transition region.

The ethylene copolymers of acenaphthylene, while demonstrating polyethylene like crystallinity at ambient temperatures, show compatibility (solubilities) broader than polyethylene in the melt and so are useful in melt processses polyethylene blends and composites where higher degrees of dispersion prove of value.

Copolymers of ethylene and acenaphthylene appear to have unusual mechanical properties in that the stiffness modulus is higher than that of the low pressure homopolymer of ethylene above 0° C. and mechanical spectra indicate no evidence of an independent "$\beta$" transition even at substantial levels of comonomer. There is evidence also, that acenaphthylene as a comonomer has far less than the expected effect on crystallinity while at the same time giving a system with as unusual "needle"-like, or acicular, bladed morphology.

A copolymer with about 14.5 mol percent acenaphthylene was found to be stiffer than ethylene homopolymer above 0° C. and to have the higher stiffness extending to higher temperatures. Further, while the loss modulus indicated "$\alpha$" and "$\gamma$" mechanical transitions in the normally expected temperature ranges, there was no evidence of an independent "$\beta$" transition at an intermediate temperature. The copolymer composition was estimated by difference of monomer charge and unreacted monomer at the end of polymerization determined by gas-liquid chromatography, and evidenced by strong, broad u.v. absorption of the copolymer.

The acenaphthylene copolymer displayed unusual morphology in comparison with that expected for ethylene copolymers. The copolymer contained 14.5 mol percent acenaphthylene (about 48 wt. percent). On the basis of geometrical factors (e.g., van de Waals radius) and concentration, this level of comonomer incorporation would be expected to have a sizable influence on crystallinity —yet, as a comonomer acenaphthylene was found to have about one-half the effect on relative x-ray reflection intensities of that of linear side chains. Further, polymer precipitated from octadecane in an effort to develop single crystals led to recovery of very fine needles and bundles of needles. These needle-structures look something like the acicular, bladed crystals for linear polyethylene crystallized under pressure. Such copolymer structures are of folded conformation rather than extended chain conformation.

Electron diffraction pattern of the ethylene-acenaphthylene copolymer "needles" shows a very high degree of crystalline order in such copolymer.

In preparing a copolymer, the reactants are ethylene and acenaphthylene. In preparing a terpolymer, the reactants are ethylene, acenaphthylene and an alpha-olefin having from 3 to 12 carbon atoms, preferably from 4 to 8 carbon atoms. Examples of useful alpha-olefins are butene-1, octene-1, octadecene-1 and propylene. As used herein, the term alpha-olefin excludes ethylene.

A typical broad composition distribution ethylene terpolymer of hexene-1 and acenaphthylene produced by this invention has these characteristics: a yield strength of 2656 psi, an ultimate strength of 4131 psi and an elongation of 440 percent; and has a stiffness modulus vs. temperature response equivalent to that of high density polyethylene.

By the term non-uniform polymer is meant a polymer composition produced by the reaction of a polymerizable reactant mixture of the monomers defined. In the case at bar, the polymeric compositions of ethylene and acenaphthylene unexpectedly are photodegradable and are highly crystalline, but lack the conventional independent beta thermo-mechanical transition in the torsion pendulum loss-modulus curve possessed by known ethylene copolymers. Also, in the case at bar, the polymeric compositions of ethylene, acenaphthylene and an alpha-olefin are semi-crystalline, tough, high-modulus and semi-elastic, being more elastic than polyethylene.

The concentrations of a particular polyermizable reactant initially present in the polymerizable feed composition can vary from 0.01 weight percent to 100 weight percent based on the total weight of polymerizable reactants initially present in the particular feed stream. These concentrations can be varied at the will of the skilled individual, as is recognized in the art, to obtain the particular final concentrations of each reactant in the polymer or to obtain a particular property or characteristic in the polymer. The process employs the temperature and pressure conditions known to be suitable for the reactants employed. These conditions for the production of ethylene polymers are so well known in the art that they do not require further discussion herein to enable a skilled polymer scientist to produce the polymers of this invention.

The particular catalyst to be used in the polymerization reaction is well known to those skilled in the art. These are the so-called Ziegler or Natta catalysts. The amounts thereof are those amounts conventionally used. These facts are well known to those skilled in the art and require no further deliberation or discussion herein to enable one skilled in the art to carry out the polymerization reactions of this invention.

In this application, the following tests methods were used:

ASTM-D1638-72, for elongation, tensile strength and stiffness,
ASTM-D1822-68, for Izod impact.
ASTM-D648-72, for heat distortion.
ASTM-D746-73, for brittle temperature.

The following examples serve to further demonstrate this invention. Parts and percentages are by weight (throughout this specification) unless otherwise specified.

EXAMPLE 1

Copolymerization of Ethylene and Acenaphthylene

A series of copolymers was produced in the following experimental procedure. A weighed amount of acenaphthylene (recrystallized from heptane) was dissolved in heptane in a one-quart glass vessel. The vessel and contents were purged with nitrogen for 2 hours. Ethylene gas was then sparged through the solution for ten minutes to saturate with ethylene monomer. Catalyst was then added; the catalyst was diisobutylaluminum chloride (i-bu$_2$AlCl) and vanadium oxychloride (VOCl$_3$). Ethylene gas was then passed through the solution for 15 minutes after which the exotherm had been passed. The ethylene flow was ended and the contents of the vessel were mixed with isopropanol containing one percent of Ionol (an antioxidant). The mixture was stirred overnight. The polymer product was recovered by filtration, washed with isopropanol and dried at 50° C. in a vacuum oven (120 mm Hg).

In Run A, the above procedure was used with 10 millimols of i-bu$_2$AlCl, 0.5 millimols of VOCl$_3$ and 14.1 grams of acenaphthylene. 7.2 grams of dried copolymer was obtained. Based on unreacted monomer recovered, the copolymer contained 24 weight percent (5.84 mol percent) of acenaphthylene.

In Run B, the same conditions were used, except that 20 millimols of i-bu$_2$AlCl, 1.0 millimol of VOCl$_3$ and 14.1 grams of acenaphthylene were used. 14 grams of dried copolymer was recovered. Based on unreacted monomer recovered, the copolymer contained 48.5 weight percent (14.8 mol percent) of acenaphthylene. The copolymer, dissolved in hexadecane, was found to have an intrinsic viscosity of 7.53.

In Run C, the same conditions were used, except that 20 millimols of i-bu$_2$AlCl, 1.0 millimol of VOCl$_3$ and 2.82 grams of acensphthylene were used. 9.95 grams of dried copolymer was obtained. The copolymer contained 13.4 weight percent (2.8 mol percent) of acenaphthylene and had a molded plaque density of 0.974 g./cc.

The copolymers of Runs A to C were crystalline in nature.

In interpreting the mechanical spectra from torsion pendulum data, it is necessary to know that the storage modulus is closely related to the energy dissipated [general references are: J. D. Ferry, "Viscoelastic Properties of Polymers," John Wiley and Sons (1961), and I. M. Ward, "Mechanical Properties of Solid Polymers", Wiley-Interscience (1971)], Storage Modulus, G', falls off with temperature as does stiffness. A maximum in the loss modulus, G'', indicates the temperature range of a thermomechanical transition. The complex shear modulus, G*, the ratio of the peak stress applied to a sample to the peak strain of the sample is made up of these two components such that $$|G^*| = \sqrt{G'^2 + G''^2}$$

A graph of the mechanical properties of the copolymer, in terms of torsion pendulum data and in which the log of the storage modulus and the loss modulus are given as a function of temperature from −160° to 140° C., shows that the ethylene-acenaphthylene copolymer maintains a higher modulus to a higher temperature than the high density polyethylene homopolymer. Further, the copolymer shows no evidence of an independent beta transition in the −40° to +20° C. temperature range.

X-ray studies of the comonomers of Runs A and B, plus several other materials, were carried out using a Phillips X-ray diffractometer. An RCA model EMU-4B transmission electron microscope was used for the electron microscope studies on the same materials.

An electron micrograph of the crystal structure of high density polyethylene precipitated from dilute xylene solution at 65° C. showed the typical high density polyethylene single crystals. Electron micrographs were made of precipitated copolymers of ethylene and acenaphthylene containing, respectively, 5.84 and 14.5 mol percent of acenaphthylene (compositions determined by difference of initial and residual monomer using gas-liquid chromatography). These are the copolymers of Runs A and B, respectively. In this case, the polymer was precipitated from octadecane rather than xylene solution. In the copolymer of lower acenaphthylene content, the most characteristic material was in the form of extremely thin platelets intermixed with rod-like structures which tended to flocculate. The higher acenaphthylene content copolymer precipitated as very fine needles and bundles of needles. Some beads appearing to be possible precursors of needles were found.

Electron diffraction analysis of the acicular bladetype crystals of ethylene-acenaphthylene copolymer of Run B showed that these needle-like structures grow with their long direction parallel to the "a" crystallographic axis. The short direction in the plane of the crystal was parallel to the "b" axis, while the "c" axis (polymer chain direction) was normal to this plane of the crystal. These were folded rather than extended chain crystals. The long straight edges and feathery fibrillar ends of the smaller crystals indicated that the fold direction was generally parallel to this edge, the "a" crystallographic axis.

In Table I, X-ray crystallinity, crystallographic unit cell and crystallite sizes for the molded ethylene copolymers are compared. Acenaphthylene is less effective in reducing crystallinity on a mol basis than equivalent mol percent of 5-methylnorbornene-2, 1-butene, 1-hexene and 1-octadecene. Crystal lattice expansion resulting from incorporation of the acenaphthylene comonomer was quite small. Crystallite size generally is reduced by decreased crystallinity levels. The larger crystallite sizes may be due, in the case of acenaphthylene, to better annealing due to the molding temperature used.

The X-ray diffraction studies of the copolymers showed intensity alterations. Table II sets out the relative intensity ratios of the 110, 200 and 020 reflections. Measured peak height, rather than integrated intensities, have been used; hence, relative values are given and considered here to be appropriately simplified, but good approximations. Acenaphthylene as a comonomer had far less effect (about one-half) on the relative reflection intensities than linear side chain comonomers (not shown in Table II).

TABLE I
COMPARISON OF X-RAY CRYSTALLINITY, UNIT CELL SIZE AND CRYSTALLITE SIZE FOR ETHYLENE COPOLYMERS

| Comonomer | X-Ray Crystallinity | Unit Cell Size a | Unit Cell Size b | Crystallite Size 110 |
|---|---|---|---|---|
| Homopolymer (High Density) | 74.3% | 7.42 A | 4.94 A | 408 A |
| Homopolymer (Low Density) | 59.2% | 7.51 A | 4.97 A | 224 A |
| Acenaphthylene (5.84 mol %) | 68.3% | 7.44 A | 4.96 A | 449 A |
| Acenaphthylene (14.8 mol %) | 73.0% | 7.44 A | 4.96 A | 449 A |

TABLE II
EFFECT OF COMONOMER ON RELATIVE INTENSITY (PEAK HEIGHT) OF X-RAY REFLECTIONS

| Comonomer | $I_{110}/I_{200}$ | $I_{110}/I_{020}$ | $I_{200}/I_{020}$ |
|---|---|---|---|
| Homopolymer (High Density) | 3.24 | 33.3 | 10.2 |
| Homopolymer (Low Density) | 5.0* | 27.5 | 5.5 |
| Acenaphthylene (5.84 mol %) | 6.78 | 14.9 | 5.5 |
| Acenaphthylene (14.8 mol %) | 5.65 | 18.1 | 3.2 |

Note:
*This ration is higher than it should be for a low density polyethylene because 200 reflection is very broad. The integrated intensity is thus approximately twice that indicated by the peak height.

EXAMPLE 2

Terpolymerization of Ethylene, n-Hexene-1 and Acenaphthylene

A small glass 480 ml. capacity reactor was stirred magnetically and operated at ambient temperature. A charge of 300 ml. of heptane was sparged with nitrogen and introduced into the reactor together with 5.3 grams of acenaphthylene. A heptane solution (5 ml.) containing 7.5 mols of (i-C$_4$H$_9$)2 AlCl was then added and the solution stirred for 50 minutes.

A heptane solution of 0.41 mols of VOCl$_3$ was added and after two minutes, the reactor was pressured to 30 psig with ethylene. Within three minutes, the pressure had dropped to 16 psi. The reactor was repeatedly pressured with ethylene. Then 0.5 ml. of hexene-1 was added together with additional ethylene. Two ml. of hexene-1 were thus added. Then hexene-1 was added in 1 ml. increments with further pressuring of the reactor with ethylene. A second catalyst addition was made, equal to the initial charge, about half-way through the reaction. Cumulative pressure drops corresponding to repressuring with ethylene, amounted to 448 psi.

The reaction product was quenched with isopropanol; 21.83 grams of product was recovered, after drying in a vacuum oven at 45° C. and 2 mm of Hg, as an off-white powder.

The mechanical properties of the ethylene-acenaphthylene-n-hexene-1 terpolymer are described in FIG. 1 in terms of the log of the storage modulus and the loss modulus and the loss modulus as a function of temperature from torsion pendulum data. The properties of high density polyethylene and low density polyethylene are also given in FIG. 1. The examination, made of a terpolymer plaque molded at 155° C., showed it to be opaque, dark gray, quite stiff, tough and yet have an "elastic" character. The storage modulus (essentially the stiffness) was found to be about that of a typical high density polyethylene. The loss modulus indicates both considerable crystallinity and some short chain branching (hexene-1).

X-ray diffraction analysis indicated the terpolymer to be of intermediate crystallinity corresponding to a polyethylene in the density range of 0.92 to 0.93 g./cc. (a typical low density polyethylene has a density of about 0.917, while a typical high density polyethylene may have one in the range of 0.96.).

Tensile characteristics of the terpolymer indicate its elastic characteristics.

| Tensile Characteristics of the Terpolymer | |
|---|---|
| Yield Strength | 2656 psi |
| Ultimate Strength | 4131 psi |
| Elongation | 440% |

While the mechanical characteristics from torsion pendulum data indicate a strong similarity to high density polyethylene, tensile data indicate mixed characteristics, with tensile stress in the high density range and elongation more like a low density polyethylene. In summary, the terpolymer resembles high or low density polyethylene, depending on the property measured, but is neither one.

| Property | HDPE or LDPE |
|---|---|
| Modulus | HDPE |
| Elongation | LDPE |
| Tensile Strength | HDPE |
| X-Ray Diffraction | LDPE |
| Infrared CH$_3$/100 CH$_2$ | LDPE |

A comparison was made of the properties of the copolymer of this invention with the properties of certain known polymers.

Figure 2:
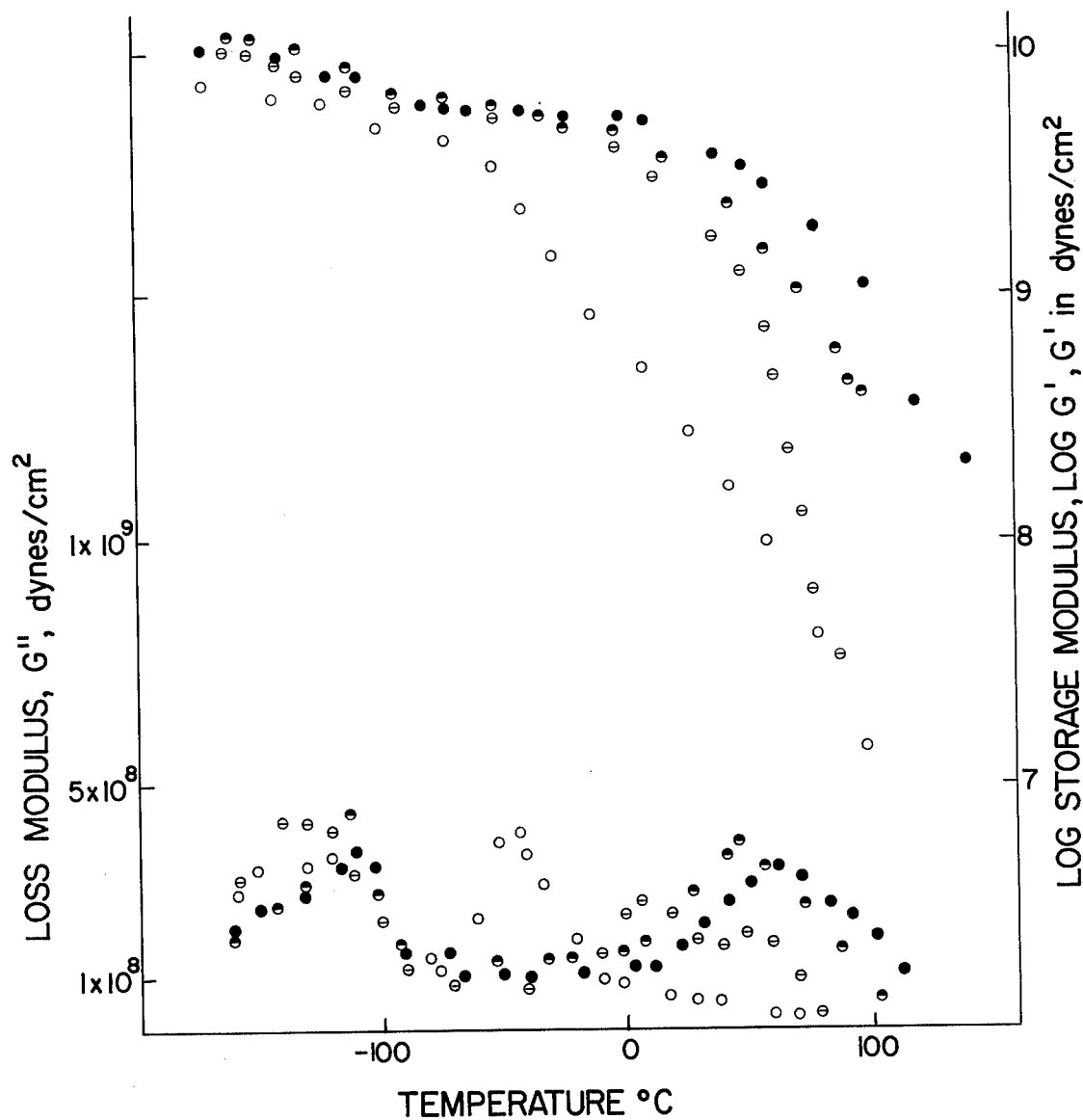
FIG. 2 is a graph of the mechanical properties of the copolymer.

The mechanical properties of an ethylene copolymer estimated to contain about 14.5 mol percent of acenaphthylene comonomer are given in FIG. 2 in terms of the loss modulus, G", and the log storage modulus, G', as functions of temperature. These date are compared with the mechanical properties of ethylene copolymers with hexene-1, 5-methylnorbornene-2 and linear, high density polyethylene—see FIG. 2. The level of the storage modulus (log G', related to stiffness) with temperature were compared and the temperature of the intermediate, β-transition, a maximum in the loss modulus (G"), were compared. In this regard, the copolymer with acenaphthylene has a stiffness comparable with high density polyethylene below 0° C., but a higher stiffness extending to higher temperatures above 0° C. than HDPE. The "α" and "γ" transitions for the acenaphthylene copolymer occurred in expected temperature ranges, but there was no evidence of an independent "β" transition.

In this comparison, crystalline morphology of copolymers of ethylene and 5-methylnorbornene-2 containing one-half to about two mol percent of the norbornyl derivative was examined with electron microscopy for variation of β-transition temperature. Single crystals and cast films of these were compared with those of high density polyethylene. It was apparent that minor amounts of 5-methylnorbornene-2 comonomer had pronounced effects on the size and perfection of polymer single crystals. In cast films, this tendency showed up in a reduction of longer range, three dimensional order and development of fibrillar structures similar to, but extending over shorter distances than, the fibrillar structures in typical low-density polyethylenes. Ethylene copolymers of two broad classes, were the comonomer is a 1-alkene of which 1-hexene is an example and where the comonomer is similar to a norbornyl group, substituting on directly adjacent chain carbon atoms, such as, acenaphthylene were also studied.

The ethylene-acenaphthylene copolymers showed strong absorption in the infrared and ultraviolet regions indicating the ethylene-acenaphthylene are photodegradable materials.

The terpolymer of this invention can contain 55 to 87 mol percent of ethylene, 3 and 20 mol percent of acenaphthylene and 10 to 25 mol percent of another alpha-olefin.

The ethylene-acenaphthylene copolymer system of this invention is a starting composition for further reaction based on the aromatic substitution in a crystalline, ethylene copolymer.

One ordinarily skilled in the art would think that an ethylene-acenaphthylene copolymer also containing a sufficient amount of another alpha-olefin comonomer (such as, propylene, butene-1 or hexene) would render the polyethylene composition amorphous — sufficient acenaphthylene raising the glass transition above 50° C. The concept would be a higher softening, glassy polyolefin composition which would also have high impact strength. But the resulting terpolymer of this invention unexpectedly does not have such properties — the terpolymer of this invention is not a glassy polyolefin.

The terpolymer of this invention of ethylene, acenaphthylene and another alpha-olefin, (such as n-hexene-1) is in direct contrast to the copolymer of this invention of ethylene and n-hexene-1 in that the terpolymer is a tough, semi-crystalline, high-modulus, but somewhat elastic material. In modulus and tensile strength, the terpolymer resembles high density polyethylene and, in elongation and structure (x-ray diffraction and $CH_3$ content), it resembles low density polyethylene.

The terpolymer of this invention has properties which make it useful for a variety of packaging uses, such as, fertilizer bags and the like, and for pipe applications.

Introducing an alpha-olefin into the copolymer of the first embodiment of this invention produces an elastic, high modulus "polyethylene-like" terpolymer. The terpolymer has an improved degree of elasticity over polyethylene. The terpolymer is a broad composition distribution, semi-crystalline material—it is both tough and elastic.

What is claimed is:

1. A compatible blend of high density polyethylene and a highly crystalline non-uniform copolymer comprised of ethylene and acenaphthylene; said blend having a higher use temperature than said high density polyethylene by itself, said non-uniform copolymer being one which lacks the independent beta thermomechanical transition in the torsion pendulum loss modulus curve possessed by known copolymers of ethylene and which is produced by the process of initiating polymerization of a reaction mixture of acenaphthalene; ethylene; a Ziegler or Natta catalyst; and an organic solvent, and thereafter continuously introducing ethylene monomer to the reaction mixture during the polymerization reaction.

2. A compatible blend of low density polyethene and a highly crystalline non-uniform copolymer comprised of ethylene and acenaphthylene, said blend having a higher use temperature than said low density polyethylene by itself, said non-uniform copolymer being one which lacks the independent beta thermomechanical transition in the torsion pendulum loss modulus curve possessed by known copolymers of ethylene and which is produced by the process of initiating polymerization of a reaction mixture of acenaphthylene; ethylene; a Ziegler or Natta catalyst; and an organic solvent, and thereafter continuously introducing ethylene monomer to the reaction mixture during the polymerization reaction.

3. A polymeric material comprised of a tough, semi-crystalline, high-modulus, semi-elastic, non-uniform terpolymer comprised of ethylene, acenaphthylene and a different alpha-olefin, said non-uniform terpolymer being more elastic than polyethylene, said non-uniform terpolymer being produced by the process of initiating polymerization of a reaction mixture of acenaphthylene; ethylene; a Ziegler or Natta catalyst; and an organic solvent, and thereafter continuously introducing ethylene monomer to the reaction mixture during the polymerization reaction, and continuously introducing the different alpha-olefin monomer to the reaction mixture during the final stage of the polymerization reaction.

4. A polymeric material as described in claim 3, wherein said alpha-olefin is n-hexene-1.

* * * * *

UNITED STATES PATENT OFFICE
CERTIFICATE OF CORRECTION

Patent No. 4,093,678　　　　　　　　Dated June 6, 1978

Inventor(s) Frederick Eugene Bailey et al

It is certified that error appears in the above-identified patent and that said Letters Patent are hereby corrected as shown below:

Abstract, first line of second paragraph, "though" should read --tough--

Col. 1, line 25, "modles" should read --models--
Col. 1, line 42, "modules" should read --modulus--
Col. 1, line 54, "case" should read --cast--
Col. 1, line 66, "comprises" should read --comprised--
Col. 3, line 50, "as" should read --an--
Col. 4, line 42, "polyermizable" should read --polymerizable--
Col. 5, line 47, "acensphthylene" should read --acenaphthylene--
Col. 7, line 28, "ration" should read --ratio--
Col. 8, line 42, "date" should read --data--
Col. 9, line 13, "and" should read --to--

Signed and Sealed this

Fourteenth Day of November 1978

[SEAL]

Attest:

RUTH C. MASON
Attesting Officer

DONALD W. BANNER
Commissioner of Patents and Trademarks